United States Patent [19]
Schlienger

[11] Patent Number: 5,812,586
[45] Date of Patent: Sep. 22, 1998

[54] METHOD AND APPARATUS FOR REMOVING A MOLTEN SLAG WITH A VACUUM FROM A CHAMBER

[75] Inventor: Max P. Schlienger, Ukiah, Calif.

[73] Assignee: Lockheed Martin Advanced Environmental Systems, Inc., Ukiah, Calif.

[21] Appl. No.: 666,036

[22] Filed: Jun. 19, 1996

[51] Int. Cl.[6] ............................... H05B 7/00; F27D 3/00
[52] U.S. Cl. ............................ 373/18; 373/20; 373/78; 373/79; 266/45; 75/582
[58] Field of Search ................. 373/8–9, 18–20, 373/79, 142, 78; 266/37–45, 242; 75/582, 584

[56] References Cited

U.S. PATENT DOCUMENTS

| | | | |
|---|---|---|---|
| 3,632,096 | 1/1972 | Perry | 266/37 |
| 3,867,132 | 2/1975 | Perry | 266/37 |
| 5,305,990 | 4/1994 | Sherwood | 266/45 |
| 5,408,494 | 4/1995 | Schlienger | 373/20 |

*Primary Examiner*—Tu B. Hoang
*Attorney, Agent, or Firm*—Townsend and Townsend and Crew

[57] ABSTRACT

Slag from a pool of molten slag floating on molten metal in a plasma arc treatment chamber is removed by providing a slag container located inside the chamber which has a slag intake pipe extending from a bottom of the container downwardly into the slag pool. A vacuum line is connected to the top of the container and a vacuum source. When a vacuum is applied to the inside of the container, the pressure prevailing in the chamber pushes the slag from the pool through the intake pipe into the container. When the container becomes filled with molten slag, the latter enters a section of the line communicating the top of the container with the vacuum source. As the slag enters the pipe section, it is cooled and solidified to prevent further slag flow into or gas (air) flow through the vacuum line so that the container can be lifted out of the chamber while the slag in the container is still in its molten state without causing slag spillage.

25 Claims, 2 Drawing Sheets

METHOD AND APPARATUS FOR REMOVING A MOLTEN SLAG WITH A VACUUM FROM A CHAMBER

BACKGROUND OF THE INVENTION

The present invention relates to the removal of molten materials, such as molten slag, which float in a treatment chamber, such as a furnace, on a pool of another molten material, such as molten metal. The invention is particularly adapted for the efficient removal of molten material, such as slag or metal, for example, from a plasma arc centrifugal treatment ("PACT") chamber.

Treating of toxic or hazardous wastes or producing of certain high value metals from revert material, scrap or elemental alloying can be accomplished in a PACT system or a Static Hearth Plasma Treatment System. A particularly well-suited and widely used type of treatment furnace employs a rotating crucible and a plasma torch which extends into the crucible and heats the metal therein, including any slag that may be present, until both are molten. During heat treatment the crucible rotates at relatively high speeds so that centrifugal forces cause the material, e.g. metal and slag, to rise along the upright wall of the crucible. Such a rotary plasma arc furnace is disclosed, for example, in the commonly owned U.S. Pat. No. 5,408,494, the disclosure of which is incorporated herein by reference.

Generally speaking, in such a furnace the crucible has a rotatably mounted base from which a normally circular upright wall extends. The crucible has an open top and is normally disposed inside a stationary treatment chamber or housing which is sealed from the exterior so that a controlled atmosphere can be maintained. Materials, typically in the form of solid pieces, alloying materials and additives, are placed inside the chamber and an arc is struck to generate a hot plasma flow with a plasma torch which is directed onto the material in the furnace. During melting and treatment of the materials in the crucible the latter rotates so that centrifugal forces urge the materials against and partially up the upright crucible wall. As the material melts, the material with the highest specific gravity, e.g. the metal, is forced against the upright walls of the crucible. Materials having a lesser density, such as slag, will form a layer which is radially inward of the metal.

After completion of the treatment, the metal and slag are gravitationally drained through a downwardly open throat formed in the base of the crucible, for example at its center of rotation. This is typically done by slowing the rotation of the crucible sufficiently so that the slag, which is radially inward of the metal, flows down along the metal and into the throat while centrifugal forces still urge the molten metal against the upright crucible wall. After substantially all slag has been drained, rotation of the crucible is further slowed to reduce the centrifugal forces and permit the metal to drain through the throat. The slag is collected in a container placed beneath the crucible and the metal is directed into a suitable mold, container or conduit.

Little control can be exercised over the removal of the slag once it begins to drain through the throat. The amount of slag in the crucible may vary from batch to batch. As a result there is the danger that the slag catching container may overflow because in practice it is difficult to monitor it beneath the crucible unless the container is made excessively large, which undesirably increases its size and therewith the overall size of the PACT chamber.

In addition, since the slag container must be placed beneath the crucible, the PACT chamber is relatively high, another undesirable result of the prior art practice of draining the slag through the throat of the crucible.

SUMMARY OF THE INVENTION

The present invention overcomes the difficulties encountered in the past when removing metal and slag from treatment chambers by withdrawing the molten slag floating on the molten metal with a vacuum in an upward direction so that, thereafter, the remaining molten metal alone can be drained through the throat of the chamber. Alternatively, slag and metal can be selectively removed with the vacuum. Further, the metal pool can be superheated after slag removal and the metal component of the material in the crucible can be vacuum teemed thereafter.

Broadly speaking, this is attained by extending the lower, open end of a conduit, which may depend from a slag container located in the treatment chamber, for example, stopping or greatly reducing the rate of rotation of the crucible so that a pool of molten slag forms on top of a pool of molten metal, and then applying a vacuum to the conduit to suck the molten slag upwardly into the container. In a presently preferred embodiment, a vacuum line extends from the upper end of the slag container to a vacuum source located outside the treatment chamber.

Thus, when it is time to remove the slag, e.g. before draining the molten metal through the throat of the crucible, the free end of the lower conduit is extended into the molten slag pool and the vacuum source is energized, thereby pulling a vacuum in the slag container and causing the molten slag to flow from the pool upwardly through the conduit into it. When the container is filled with slag, or the slag removal operation has been completed, the fluid line between the slag container and the vacuum source is closed. Thereafter, and while preventing the molten slag in the container from flowing out of the lower conduit of the container, the container is lifted from the treatment chamber for subsequent cooling, disposal and/or further use.

To prevent the molten slag in the container from gravitationally flowing out of it, the fluid connection between the container and the vacuum source is preferably automatically closed. In one embodiment this is done by permitting a small quantity of molten slag to enter the vacuum line and shaping the line so that the slag therein quickly freezes or hardens. This blocks further fluid communication through the vacuum line. As a result, even if the vacuum source is not deactivated, no further vacuum is applied to the slag container and no further slag can be drawn into it. Further, the frozen slag in the vacuum line forms a plug which prevents air (or a gas in the treatment chamber) from flowing into the container so that the molten slag therein cannot gravitationally flow out of it, e.g. onto the molten metal pool in the treatment chamber. Thus, the container can be lifted out of the treatment chamber as soon as it has been filled with slag without the danger of spilling slag from it.

The present invention provides numerous advantages, including a significant reduction in the overall height of the treatment chamber because instead of being stacked on top of each other, the slag container is partially or wholly nested inside the crucible, eliminating an overfilling of the slag container, because of the above-mentioned automatic shut-off of the vacuum when the container is filled, and a simplification of the control and coordination of the furnace. In addition, the present invention permits a selective withdrawal or teeming of slag and metal from the crucible by flowing them in different directions and through separate orifices, if desired. Each orifice, i.e. the throat through which the metal flows and the conduit through which the slag flows into the slag container, can be constructed to better withstand the corrosiveness of the respective materials, thereby enhancing the service life of the furnace and rendering it less expensive to operate. Still further, the invention simplifies the configuration of the throat and the geometry of the crucible base or bottom and the drive system for it. The bottom orifice or throat can be plugged to enable both vacuum teeming of slag and gravity teeming of metal into suitable containers. However, it is possible to vacuum teem the slag followed by vacuum teeming the metal component, enabling all materials to be removed from the top of the PACT chamber. FIGS. 3 and 4 show arrangements suitable for all materials to be vacuum teemed.

Vacuum teeming of both slag and metal enables minimum equipment height and simplifies centrifuge and centrifuge drive construction.

Of particular advantage is the automatic termination of the slag teeming process when the container is filled by freezing molten slag when it first enters the vacuum line from the container to the vacuum source. In a preferred embodiment, it takes place automatically and, therefore, requires no control instrumentation, close visual observance to prevent an overfilling of the container, which may be difficult to achieve and/or is expensive, or enlarging the overall size of the treatment chamber so that it can accommodate oversize slag containers.

The slag container itself can have any desired geometry and it can be constructed of any suitable material, provided it is capable of withstanding the high temperatures inside the treatment chamber, the pressure differential between the interior and the exterior of the container caused by the applied vacuum, and the corrosiveness of the slag. The slag container can be placed at any desired location above the pool of molten slag as long as the applied vacuum is sufficient so that the pressure differential between the exterior and the interior of the container causes an upward flow of the molten slag (or metal if it is desired to also remove the metal in this manner) from the slag pool into the container. This height will vary with the specific gravity of the material which is being pulled up. Thus, typical glassy slags can be pulled up to a height of about 10 feet (above the molten slag pool), while the much heavier metals can only be pulled to a correspondingly lesser height. Steel, for example, can be pulled to a height of only about 4 feet. For the relatively small furnaces typically employed for treating toxic waste and high value metal revert, these heights are more than ample.

DESCRIPTION OF THE PREFERRED EMBODIMENTS

Figure 1:
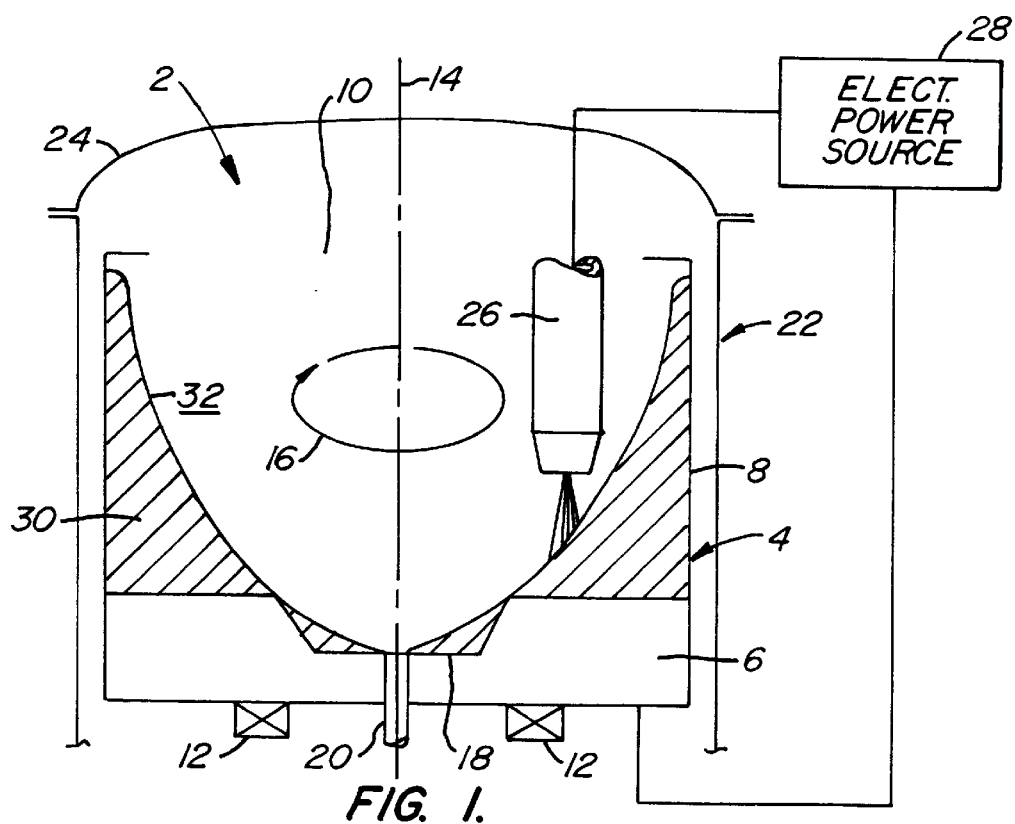
FIG. 1 is a fragmentary, schematic, front elevational view, in section, of a PACT system and shows the crucible thereof rotating at a relatively high speed.

Referring first to FIG. 1, in a preferred embodiment the slag vacuum removal system of the present invention is utilized for removing slag from a plasma arc treatment ("PACT") chamber. The construction of such treatment chambers is well known and is therefore not described in detail. Broadly speaking, however, such a chamber 2 has a rotating crucible or drum 4 formed by a drum base or bottom 6 from which an upright, normally cylindrical wall 8 extends. The crucible has an open upper end 10 and is mounted on suitable bearings 12. A drive (not illustrated) rotates the drum about its axis 14 as indicated by arrow 16. The base of the drum has a well 18 at its center and a throat 20 through which molten material can gravitationally drain out of the drum. The lower end of the throat is connected to and/or directs materials draining out of the drum into a suitable conduit, container, mold or the like (not shown).

A housing 22 which includes a removable top cover 24 encapsulates the rotating drum and hermetically seals it from the exterior thereof so that a controlled atmosphere in terms of its contents and/or pressure can be maintained inside the PACT chamber 2. For simplicity, the lower end of the housing is not illustrated because its construction is well known to those skilled in the art.

A plasma arc torch 26 is suitably, typically pivotally, mounted to the housing, e.g. its top cover 24, and is connected to an electric power source 28.

In use, say for treating toxic or hazardous waste or producing certain high value metals from revert materials, the material, in solid or molten form, together with needed additives, is placed into the drum 4 through a feed opening (not shown) which may be mounted on top cover 24, for example. An arc is struck with plasma torch 26 and hot plasma generated by it is directed onto the materials placed into the drum. Simultaneously therewith, or after metal placed immediately beneath the plasma torch has been melted, the drive for the drum is activated and it begins to rotate while the plasma torch continues to heat the materials in it. Molten material is forced radially outwardly by the centrifugal forces acting on it so that the molten material 30 migrates upwardly along drum walls 8 and forms a concave liquid surface 32. The heavier metal collects along the upright wall while the lighter slag forms a layer thereover and defines the liquid surface 32.

Figure 2:
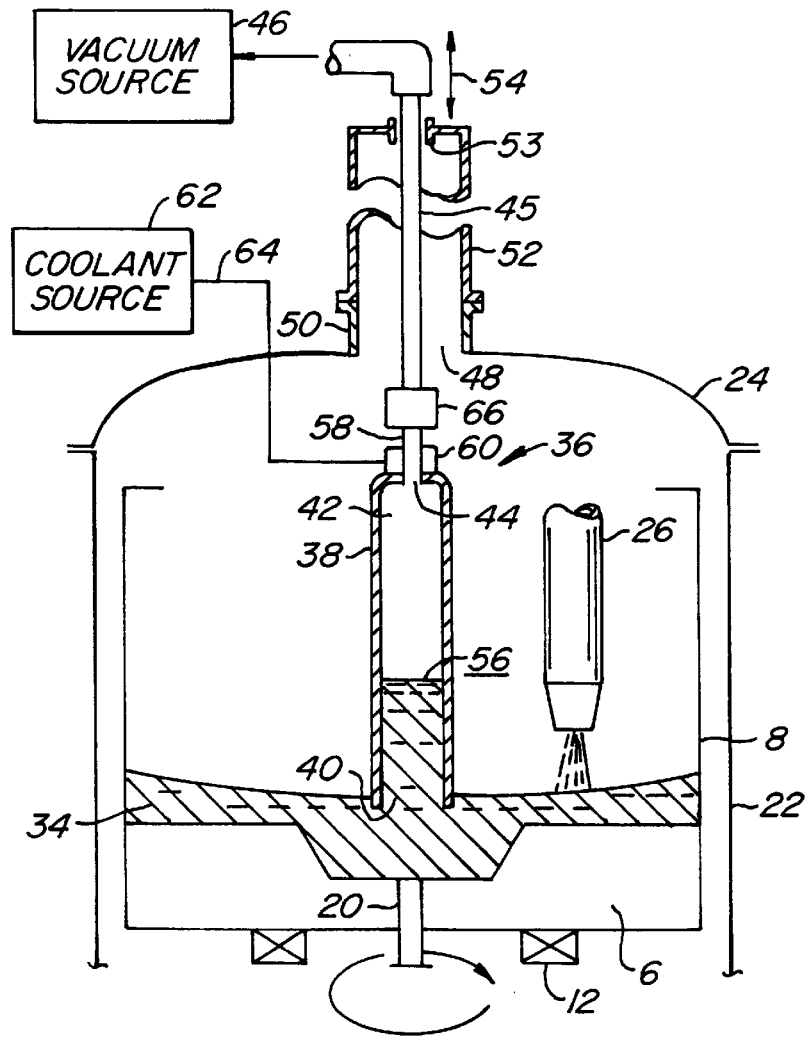
FIG. 2 is a fragmentary, front elevational view, in section, similar to FIG. 1, shows the crucible stationary or rotating at a low rate, and illustrates the vacuum slag removal system of the present invention.

Referring now to FIGS. 1 and 2, following completion of the heating, treatment, alloying, etc. of the metal in drum 4, rotation is slowed or stopped and the molten material forms a pool 34 on top of drum base 6. Due to the different specific gravities of metal and slag, the molten metal will form a lower pool on top of the drum base and the molten slag forms a slag pool on top of the metal pool. Before the molten metal is drained from the drum through throat 20, the slag pool is removed with a vacuum slag removal system 36.

The vacuum removal system includes a slag container 38 which has a slag intake opening 40 at its lower end, an interior 42, and a vacuum opening 44 at its upper end. A vacuum line 45 establishes fluid communication with a vacuum source 46 so that the interior of the container becomes a vacuum chamber.

Further, top cover 24 of the housing includes an access opening 48, defined, for example, by a flange 50 coupled to a pipe 52 of sufficient size so that the slag container can be axially moved out of the PACT chamber 2 into the pipe with suitable hoisting equipment (not shown) for subsequent use or disposal. The pipe can be provided with suitable sliding seals 53 and closure plates (not shown) so that the slag container can be removed from the PACT chamber without compromising the seal between the PACT chamber and the exterior of the housing. The construction of such seals and/or closures is well known to those skilled in the art and, therefore, is not further described herein.

When it is time to remove the slag floating on top of the molten metal pool, the slag container is lowered in an axial direction, as indicated by arrow 54, until the slag intake opening 40 of the container is submerged in the molten slag pool. Thereafter the vacuum source is energized, or a valve (not separately shown) between the source and the slag container is opened to apply a vacuum to the interior 42 of the container. Since the submerged end of the slag container in the vicinity of the slag intake opening forms a liquid seal with the molten slag, the pressure prevailing in the PACT chamber, which exceeds the vacuum on the interior of the slag container, forces molten slag upwardly from the slag pool through the slag intake opening into the interior of the slag container.

As the withdrawal of the slag continues, the slag level 56 in the container rises and will eventually reach the end of vacuum line 45. To prevent the molten slag from entering the vacuum line, a slag cooler 60 is placed about, or incorporated in, a short conduit section 58 immediately above vacuum opening 44. The cooler may, for example, comprise a water cooled copper sleeve coupled to a coolant source 62 via a coolant line 64. When the molten slag enters the cooled pipe section 58, it freezes or solidifies. This forms a solid plug in the pipe section which prevents a further upward flow of the molten slag. As a result, even if a vacuum is present in vacuum line 45, no additional slag will be pulled into the slag container and slag will not enter and contaminate the vacuum line.

A suitable pipe coupler 66 connects pipe section 58 extending upwardly from the slag container to the lower end of vacuum line 45. Since the coupler is located above cooler 60, no slag can enter the pipe coupler. Thus, following the withdrawal of the slag container from the PACT chamber, it can be disconnected from the vacuum pipe and a new, empty slag container can be attached thereto which can again be lowered into the PACT chamber for the removal of any remaining slag, for withdrawing the slag following the treatment of the next batch of metal in the chamber, or for removing the metal from the treatment chamber, instead of draining it through the throat.

When the slag container is withdrawn from the PACT chamber, the frozen slag plug in pipe section 58 of the slag container prevents air (or gas) from flowing through vacuum opening 44 into the interior 42 of the container. Thus, no slag will flow out of the slag intake opening 40, even if the slag in the container is in its molten state.

Slag container 38 is dimensioned and positioned so that the height difference between the portion of pipe section 58 surrounded by cooler 60 and the slag pool permits the relatively higher pressure prevailing in the PACT chamber to push the molten slag upwardly into the pipe section where the slag will freeze to form a frozen plug. Should this height be greater than the maximum height to which the pressure in the PACT chamber can push the open slag, a plug would not form, the slag container would only partially fill with molten slag, and, upon the removal of the slag intake opening from the molten slag pool, molten slag could flow out of the intake opening when the vacuum source is disconnected from the interior 42 of the container. In such an event, a suitable valve (not shown) can be installed in the pipe section and closed before the vacuum is disconnected.

Figure 4:
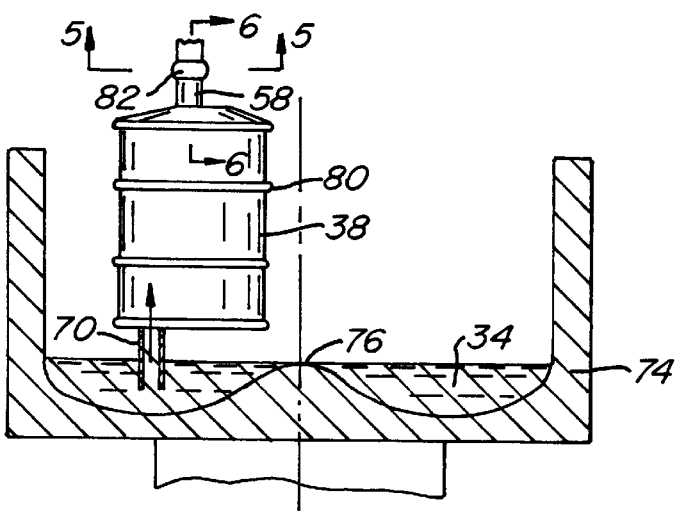
FIGS. 3 and 4 are fragmentary, front elevational views, in section, similar to FIG. 2, and illustrate different embodiments of the vacuum slag removal system of the present invention.
Figure 3:
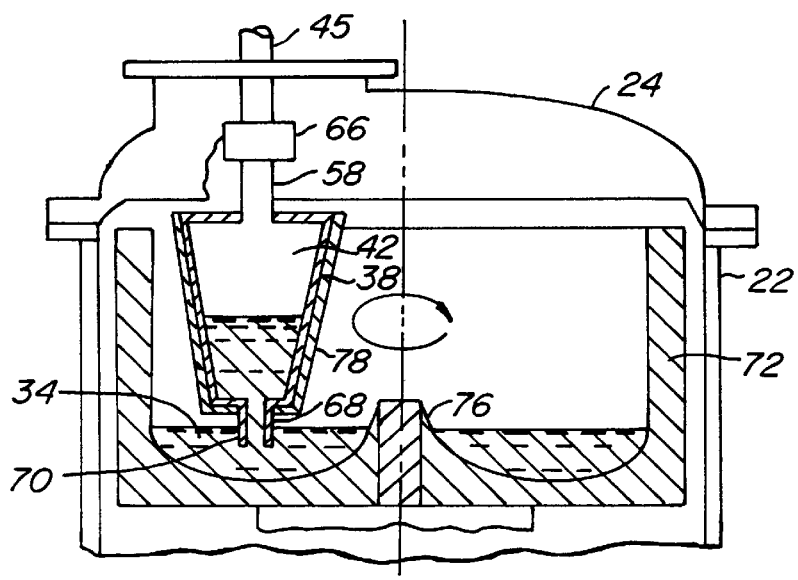

In practice, it will normally be preferred to provide the slag container with a closed bottom 68, as is illustrated in FIGS. 3 and 4, instead of having a fully open lower end as is illustrated in FIG. 1. Such a container is positioned so that its bottom 68 is located above the molten pool 34 of material, e.g. molten slag floating on top of molten metal. The intake pipe extends downwardly from the slag bottom into the pool of molten slag and its lower end defines the slag intake opening for the container. In all other respects the vacuum slag removal system illustrated in FIGS. 3 and 4 corresponds to the one described in conjunction with FIG. 2.

Further, FIGS. 3 and 4 show rotating drums or crucibles 72, 74, respectively, which have different inside configurations and, for example, have a center rise 76 at their respective bases instead of the throat 20 shown in FIG. 1. However, the furnaces illustrated in FIGS. 3 and 4, like the furnace shown in FIG. 2, include a sealed housing 22 with a removable top cover 24 as was described above.

To prevent excessive heating of the slag container while disposed in the PACT chamber, a layer of insulation 78 (shown in FIG. 3 only) can be applied to the exterior of the container or, if desired, to its interior (not shown). Further, the slag intake pipe 70 can be located at the center of the slag container (FIG. 3) or it can be offset with respect thereto, as is illustrated in FIG. 4, particularly if the geometries and/or the relative sizes of the container and the furnace make this necessary. To provide the container with sufficient strength to withstand the pressure differential between its interior and exterior, strengthening ribs 80 can be applied to its exterior, or to its inside (not shown).

Figure 5:
FIG. 5 is an enlarged, cross-sectional view that is taken on line 5—5 of FIG. 4.
Figure 6:
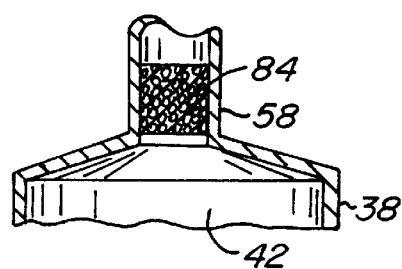
FIG. 6 is a fragmentary, side elevational view, in section, and is taken on line 6—6 of FIG. 4.

Referring to FIGS. 5 and 6, as an alternative to using a cooler 60 (shown in FIG. 2) for freezing the molten slag when it enters vacuum pipe section 58, a portion 82 of the pipe section can be flattened to establish a high outer-surface-to-inner-volume ratio so that, when the molten slag enters the flattened pipe section, the relatively large heat transfer from the slag to the exterior of the pipe section causes the former to freeze and form a plug that prevents molten slag from flowing further up vacuum line 45. This embodiment of the present invention is useful in instances in which the atmosphere surrounding pipe section 58 has a temperature below the melting temperature for the slag.

In yet another embodiment of the invention, and instead of providing a cooler 60 (as shown in FIG. 2), a flattened pipe section 82, or a shutoff valve (not shown), as earlier discussed, a porous plug 84, made from refractory material, for example, can be installed in pipe section 58. When a vacuum is applied to line 45, gas from the interior 42 of the container flows through the plug, thereby establishing a vacuum in the container and causing liquid slag to move upwardly into the container as previously described. Once the slag reaches the plug 84, it enters the pores and, due to their small diameters, closes them off and prevents slag from flowing past the plug. Likewise, when the slag container is disconnected from the vacuum line, air (or other gas) is prevented from flowing past the plug into the interior 42 of the container. Thus, even if the slag in the container is in its molten state, it is retained therein and will not flow out of the slag intake opening. This embodiment is particularly useful in instances in which the temperature surrounding pipe section 58 exceeds the melting temperature of the slag.

Although the present invention was described in conjunction with a PACT chamber, it can also be used for the removal of molten slag from other furnaces such as static hearth treatment systems, open hearth furnaces and the like so long as a positive pressure differential can be maintained between the exterior and the interior of the slag container.

What is claimed is:

1. A method for removing molten slag from a furnace comprising the steps of:

providing a vacuum chamber which is sealed from its surroundings;

positioning the vacuum chamber within the furnace;

establishing flow communication between the molten slag and the vacuum chamber;

generating a vacuum in the vacuum chamber so that the slag is drawn into the vacuum chamber;

thereafter discontinuing the steps of establishing flow communication; and retaining in the vacuum chamber the molten slag previously drawn into the vacuum chamber.

2. A method for removing from a furnace molten slag floating on molten metal comprising the steps of:

providing a vacuum chamber which is sealed from its surroundings;

positioning the vacuum chamber within the furnace;

establishing flow communication between the molten slag and the vacuum chamber;

generating a vacuum in the vacuum chamber so that the slag is drawn into the vacuum chamber;

thereafter discontinuing the step of establishing flow communication; and retaining in the vacuum chamber the slag previously drawn into the vacuum chamber.

3. A method according to claim 1 including the step of fluidly connecting the vacuum chamber with a vacuum source located outside the furnace.

4. A method according to claim 3 including the step of providing a conduit extending from the vacuum chamber to the vacuum source, and wherein the step of retaining comprises flowing molten slag into the conduit and solidifying it in the conduit.

5. A method according to claim 4 including the step of positioning a location of the solidified slag at a height above a surface level of the molten slag in the furnace which is selected so that a difference between a pressure prevailing in the furnace and in the chamber exceeds a pressure differential in the molten slag between molten slag contiguous to the slag which has been solidified and the molten slag in the furnace.

6. A method according to claim 4 wherein the step of solidifying includes a step of cooling a portion of the conduit between the chamber and the vacuum source at a location selected for solidifying the molten slag that is located within the conduit.

7. A method according to claim 1 including the step of removing the chamber from the furnace.

8. A method according to claim 7 wherein the step of generating a vacuum comprises providing a conduit from the chamber to a source of vacuum located on an exterior of the furnace, and including the steps of flowing a portion of the molten slag into the conduit, solidifying the portion of the slag while in the conduit, and thereafter disconnecting the conduit from the source prior to the step of removing the chamber from the furnace.

9. A method according to claim 3 including blocking fluid communication between the chamber and the vacuum source to therewith prevent further flow of molten slag between the interior of the chamber and the furnace.

10. A method of withdrawing molten slag from a plasma arc centrifugal furnace having an upwardly open rotor including a base, a wall extending upwardly from the base, molten metal and molten slag which float on the metal, and a housing enclosing the rotor, the method comprising the steps of positioning a slag container within the housing having a first opening at a lower end of the container and a second opening at an upper end of the container; placing the first opening inside the molten slag pool; applying a sufficient vacuum to the second opening so that a pressure differential between an interior of the housing and an interior of the slag container causes molten slag to flow into the container until the molten slag reaches the second opening; freezing a portion of the molten slag in a vicinity of the second opening while the vacuum is applied so as to close the second opening and prevent fluid communication via the second opening between the interior of the slag container and an exterior thereof; and thereafter removing the container from the interior of the housing; whereby molten slag in the container is withdrawn from the interior of the housing without flowing out of the housing through the first opening.

11. A method according to claim 10 including the step of extending a conduit from the lower end of the container downwardly into the molten slag pool so that a lower end of the conduit defines the first opening.

12. A method according to claim 10 including the step of thermally insulating the interior of the slag container from the interior of the housing.

13. A method according to claim 10 including the step of providing a vacuum source on an exterior of the housing, providing a conduit communicating an upper end of the slag container with the vacuum source so that the conduit defines the second opening, and wherein the step of freezing comprises flowing a portion of the molten slag into the conduit, and freezing the portion of the slag while in the conduit.

14. A method according to claim 13 wherein the conduit is a generally cylindrical conduit, and including the step of flattening a section of the conduit proximate the upper end of the slag container to thereby facilitate the freezing of the portion of the slag.

15. A method according to claim 13 wherein the step of freezing the portion of the slag comprises cooling a section of the conduit where the portion is located with a coolant.

16. A metal treatment furnace comprising a base; a furnace wall extending upwardly from the base; a heating device for heating metal and slag placed in the furnace; a slag container positioned within the furnace having a lower opening extending into the slag pool and an upper opening located above the slag pool; a vacuum source; and a vacuum conduit communicating the upper opening of the slag container with the vacuum source so that the insertion of the lower opening of the slag container into the molten slag and the application of the vacuum to the conduit causes molten slag to flow from the furnace into the container such that the molten slag may be removed within the container from the furnace.

17. Apparatus according to claim 16 including means for freezing molten slag which has entered the conduit in a vicinity of an interface between the slag container and the conduit.

18. Apparatus according to claim 16 including thermal insulation on the container for limiting a heat transfer between an interior of the furnace and an interior of the slag container.

19. Apparatus according to claim 16 wherein a vertical distance between the lower and upper openings is selected so that the molten slag can flow into the conduit under the vacuum applied by the vacuum source.

20. Apparatus according to claim 16 wherein the slag container comprises a drum having an upper closed end and a lower closed end, and wherein the lower opening is defined by a lower conduit extending from the lower closed end of the drum into the molten slag.

21. Apparatus according to claim 16 wherein the furnace comprises a rotary plasma arc furnace.

22. A furnace according to claim 16 wherein at least a section of the vacuum conduit proximate the upper end of the slag container has a cross-section which substantially prevents a flow of molten slag from the container into a remainder of the conduit.

23. A furnace according to claim 22 including a refractory plug in the conduit defining said cross-section of the conduit.

24. A method for removing molten slag comprising the steps of:

provyding a vacuum chamber which is sealed from its surroundings, wherein the vacuum chamber has a first opening at a lower end and a second opening at the upper end;

establishing flow communication between the molten slag and the vacuum chamber;

generating a vacuum in the vacuum chamber so that the slag is drawn into the vacuum chamber;

freezing a portion of the molten slag in a vicinity of the second opening while the vacuum is applied so as to close the second opening and prevent fluid communication via the second opening between the interior of the vacuum chamber and exterior thereof;

thereafter discontinuing the step of establishing flow communication; and retaining in the vacuum chamber the molten slag previously drawn into the chamber.

25. A method according to claim 24 including the step of releasing the vacuum in the vacuum chamber prior to the step of retaining the molten slag in the vacuum chamber.

* * * * *